(12) United States Patent
Huang

(10) Patent No.: US 7,640,666 B1
(45) Date of Patent: Jan. 5, 2010

(54) GARDENING SHEARS WITHOUT PRODUCING A GAP BETWEEN TWO CUTTING BLADES OF THE GARDENING SHEARS

(75) Inventor: Yao-Chung Huang, Changhua Hsien (TW)

(73) Assignee: Ho Cheng Garden Tools Co., Ltd., Changhua Hsien (TW)

( * ) Notice: Subject to any disclaimer, the term of this patent is extended or adjusted under 35 U.S.C. 154(b) by 248 days.

(21) Appl. No.: 11/714,544

(22) Filed: Mar. 6, 2007

(51) Int. Cl.
*B26B 13/00* (2006.01)
*B26B 1/00* (2006.01)
*B26B 13/28* (2006.01)
*B25G 1/00* (2006.01)
*B25G 1/12* (2006.01)

(52) U.S. Cl. .............. 30/234; 30/131; 30/254; 30/266; 30/270; 30/252; 30/341

(58) Field of Classification Search ............ 30/131, 30/146, 194, 244, 254, 245, 123.3, 251, 341, 30/249, 250, 266, 268, 270, 301, 252
See application file for complete search history.

(56) References Cited

U.S. PATENT DOCUMENTS

| | | | | |
|---|---|---|---|---|
| 280,047 A * | 6/1883 | Kully | ........................... | 30/259 |
| 2,073,460 A * | 3/1937 | Vosbikian et al. | ............. | 30/252 |
| 2,436,260 A * | 2/1948 | Klenk | ......................... | 30/239 |
| 2,558,697 A * | 6/1951 | Vosbikian et al. | ............. | 30/252 |
| 2,787,925 A * | 4/1957 | Buchanan et al. | ............. | 72/402 |
| 3,336,668 A * | 8/1967 | Groom | ......................... | 30/239 |
| 3,559,286 A * | 2/1971 | Pfaffenbach | .................. | 30/261 |
| 5,809,654 A * | 9/1998 | Huang | .......................... | 30/134 |
| 6,829,829 B1 * | 12/2004 | Huang | ......................... | 30/252 |
| 2003/0221321 A1 * | 12/2003 | Cheng | ......................... | 30/252 |

* cited by examiner

*Primary Examiner*—Ghassem Alie
*Assistant Examiner*—Bharat C Patel
(74) *Attorney, Agent, or Firm*—Alan Kamrath; Kamrath & Associates PA

(57) ABSTRACT

A pair of gardening shears include two cutting blades pivotally connected with each other, two movable members each having a first side mounted on a respective cutting blade, two fixing members each mounted on a second side of a respective movable member, two locking bolts each extended through the fixing members, the movable members and the cutting blades, and two locking nuts each screwed onto a respective locking bolt. Thus, the cutting blades are limited by the fixing members and the locking bolts so that the cutting blades are juxtaposed to each other closely without producing a gap between the cutting blades, thereby facilitating a user operating the gardening shears.

19 Claims, 8 Drawing Sheets

GARDENING SHEARS WITHOUT PRODUCING A GAP BETWEEN TWO CUTTING BLADES OF THE GARDENING SHEARS

BACKGROUND OF THE INVENTION

1. Field of the Invention

The present invention relates to a cutting tool and, more particularly, to a pair of gardening shears for cutting and trimming a plant, such as a tree, flower and the like.

2. Description of the Related Art

A pair of conventional gardening shears in accordance with the prior art shown in FIGS. 7 and 8 comprises two cutting blades 10 pivotally connected with each other by a screw 13 and a nut 14, two handles 11 each mounted on a lower end of a respective cutting blade 10, and two limit posts 15 each mounted on a respective handle 11 and movable to abut each other. Each of the cutting blades 10 is formed with a through hole 12 to allow passage of the screw 13. Thus, the cutting blades 10 are pivoted about the screw 13 which functions as a pivot fulcrum of the cutting blades 10. However, the screw 13 is easily unscrewed from the nut 14 due to a frequent friction so that the cutting blades 10 are easily loosened from each other, thereby producing a gap 1 between the cutting blades 10, thereby causing inconvenience to the user when operating the cutting blades 10. In addition, the screw 13 functions as a pivot fulcrum of the cutting blades 10 so that the cutting blades 10 only has a single pivot fulcrum and are easily jammed during a pivot movement of the cutting blades 10.

BRIEF SUMMARY OF THE INVENTION

In accordance with the present invention, there is provided a pair of gardening shears, comprising two cutting blades pivotally connected with each other, two movable members each having a first side mounted on a respective cutting blade, two fixing members each mounted on a second side of a respective movable member, two locking bolts each extended through the fixing members, the movable members and the cutting blades, and two locking nuts each screwed onto a respective locking bolt so that the fixing members, the movable members and the cutting blades are locked between the locking bolts and the locking nuts.

The primary objective of the present invention is to provide a pair of gardening shears without producing a gap between two cutting blades of the gardening shears.

Another objective of the present invention is to provide a pair of gardening shears, wherein the cutting blades are limited by the fixing members and the locking bolts so that the cutting blades are juxtaposed to each other closely without producing a gap between the cutting blades, thereby greatly facilitating a user operating the gardening shears.

A further objective of the present invention is to provide a pair of gardening shears, wherein the cutting blades are pivoted about the pivot holes respectively so that the pivot holes function as two pivot fulcrums of the cutting blades to facilitate pivot movement of the cutting blades, thereby preventing the cutting blades from being jammed during the pivot movement.

A further objective of the present invention is to provide a pair of gardening shears, wherein the cutting blades are guided by the guide slots respectively, so that the cutting blades are pivoted smoothly and stably, thereby facilitating the user operating the gardening shears.

A further objective of the present invention is to provide a pair of gardening shears, wherein the catch face of each of the movable members is movable to rest on the stop face of the respective fixing member, thereby preventing the cutting blades from being pivoted excessively.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
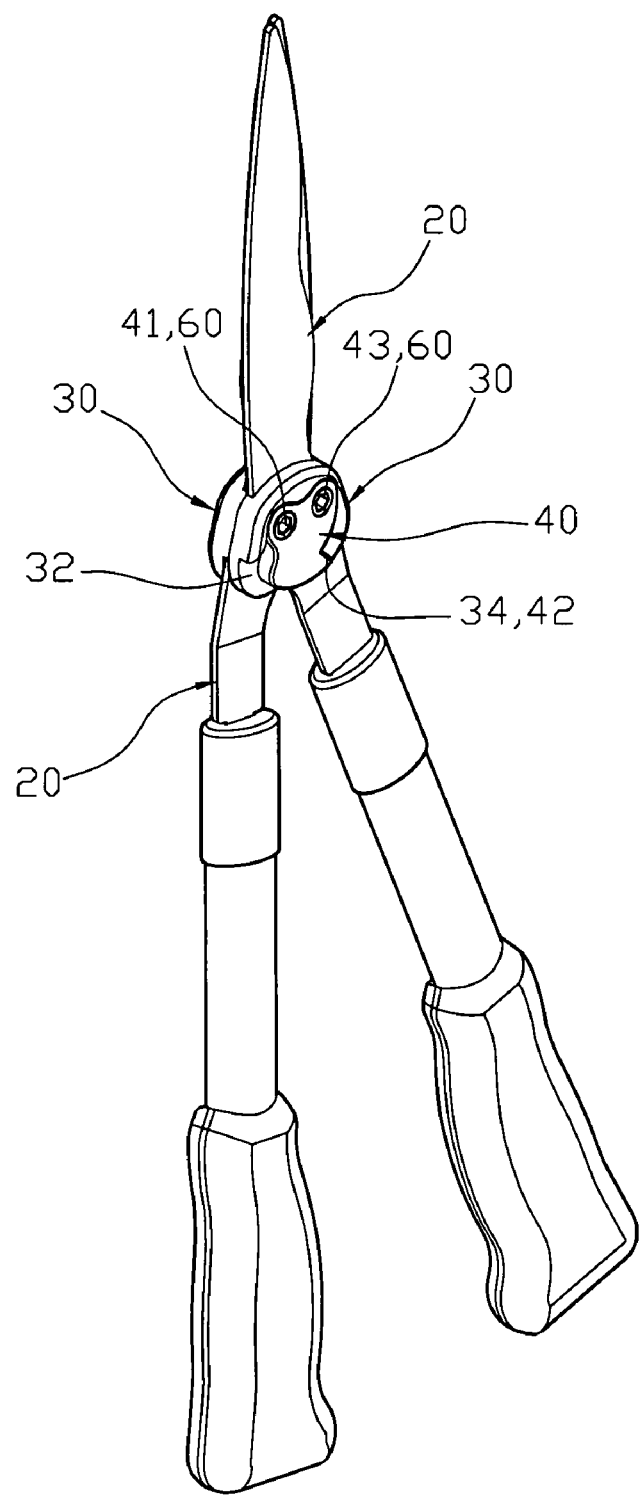
FIG. 1 is a perspective view of a pair of gardening shears in accordance with the preferred embodiment of the present invention.
Figure 2:
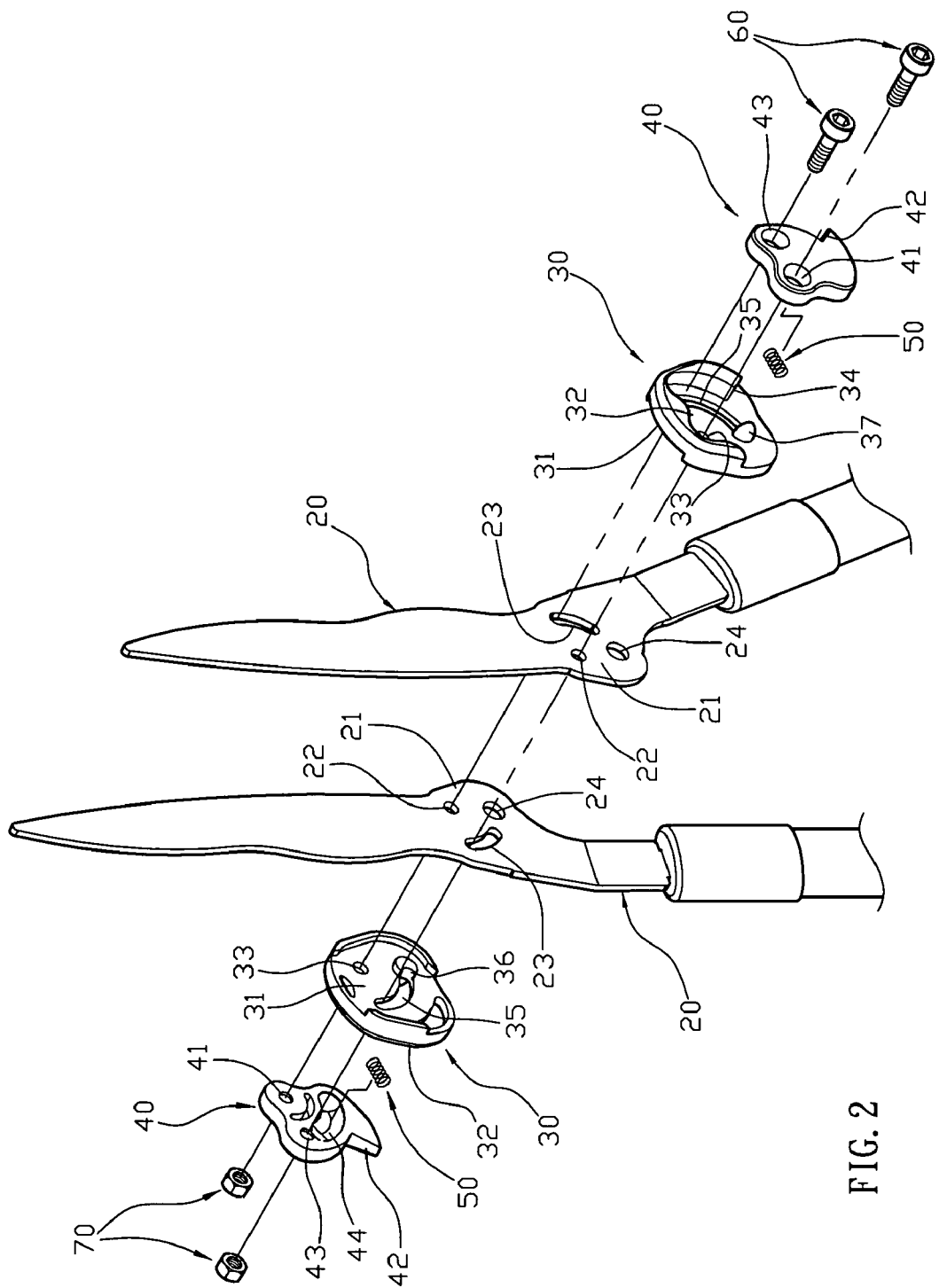
FIG. 2 is an exploded perspective view of the gardening shears as shown in FIG. 1.
Figure 3:
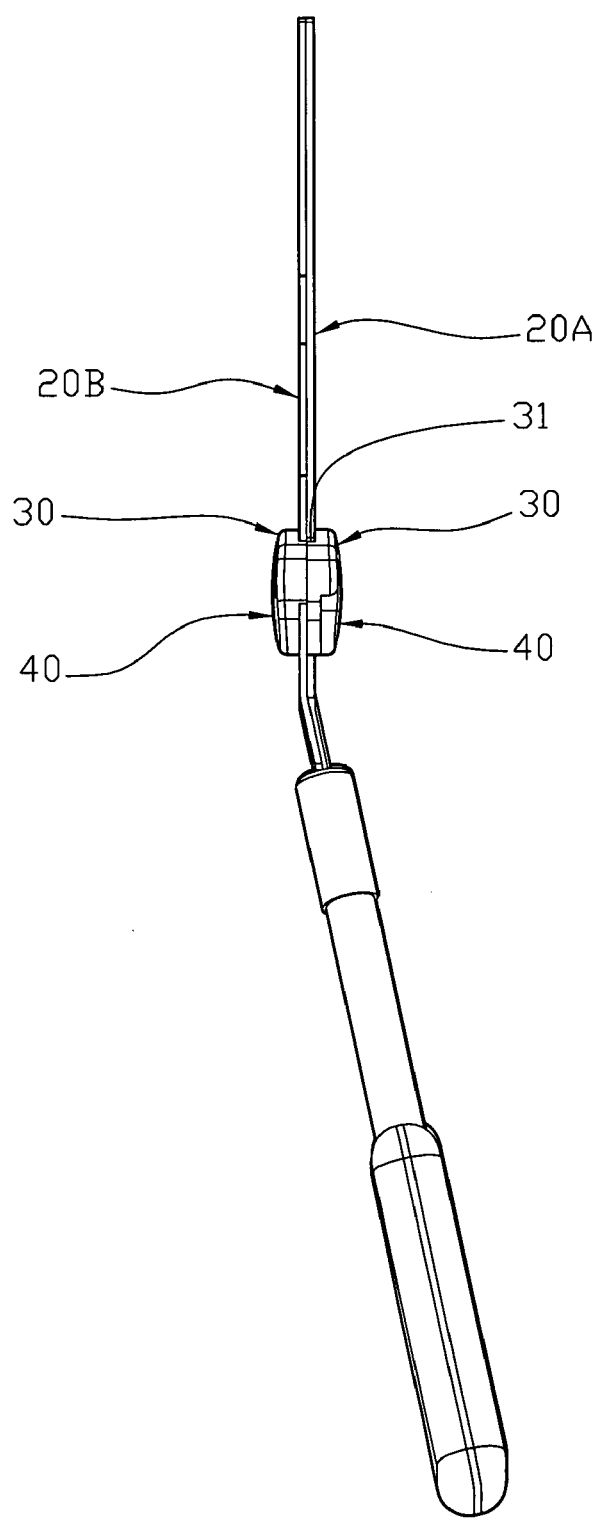
FIG. 3 is a side view of the gardening shears as shown in FIG. 1.

Referring to the drawings and initially to FIGS. 1-4, a pair of gardening shears in accordance with the preferred embodiment of the present invention comprise two cutting blades 20 pivotally connected with each other, two movable members 30 each having a first side mounted on a respective cutting blade 20, two fixing members 40 each mounted on a second side of a respective movable member 30, two locking bolts 60 each extended through the fixing members 40, the movable members 30 and the cutting blades 20, two locking nuts 70 each screwed onto a respective locking bolt 60 so that the fixing members 40, the movable members 30 and the cutting blades 20 are locked between the locking bolts 60 and the locking nuts 70, and two elastic members 50 each biased between a respective movable member 30 and a respective fixing member 40.

Each of the cutting blades 20 has a mediate portion formed with a pivot portion 21, and the pivot portions 21 of the cutting blades 20 are pivotally connected with each other by the locking bolts 60 and the locking nuts 70. The pivot portion 21 of each of the cutting blades 20 is formed with a pivot hole 22, an elongated guide slot 23 and a locking hole 24. The guide slot 23 of each of the cutting blades 20 has a substantially arc-shaped profile, and the pivot hole 22 of each of the cutting blades 20 functions as a pivot center of the guide slot 23. The pivot hole 22 and the guide slot 23 of a first one of the cutting blades 20 align with the guide slot 23 and the pivot hole 22 of a second one of the cutting blades 20 respectively.

The movable members 30 are juxtaposed to each other, so that the cutting blades 20 are encompassed by the movable members 30. Each of the movable members 30 is secured on the respective cutting blade 20 to move with the respective cutting blade 20. Each of the movable members 30 is formed with a pivot bore 33 aligning with the pivot hole 22 of the respective cutting blade 20 and an elongated slide slot 35 aligning with the guide slot 23 of the respective cutting blade 20. The slide slot 35 of each of the movable members 30 has a substantially arc-shaped profile, and the pivot bore 33 of each of the movable members 30 functions as a pivot center of the slide slot 35. The slide slot 35 of each of the movable members 30 has a first side formed with a protruding locking block 36 locked in the locking hole 24 of the respective cutting blade 20 and a second side formed with a protruding follower block 37 which has a substantially flattened spherical shape. The first side of each of the movable members 30 is formed with a positioning recess 31 secured on the pivot portion 21 of the respective cutting blade 20 and connected to the pivot bore 33 and the slide slot 35. The second side of each of the movable members 30 is formed with a receiving recess 32 connected to the pivot bore 33 and the slide slot 35 to receive the respective fixing member 40. The receiving recess 32 of each of the movable members 30 has a periphery formed with a protruding catch face 34, and the pivot bore 33 of each of the movable members 30 functions as a pivot center of the catch face 34.

Each of the fixing members 40 is located opposite to the respective cutting blade 20 and is movable in the receiving recess 32 of the respective movable member 30 when the respective movable member 30 is movable with the respective cutting blade 20. Each of the fixing members 40 is formed with a fixing hole 41 aligning with the pivot bore 33 of the respective movable member 30, a fixing bore 43 aligning with the slide slot 35 of the respective movable member 30 and an elongated receiving slot 44 in which the follower block 37 of the respective movable member 30 is movable. Each of the fixing members 40 has a substantially arc-shaped periphery formed with a protruding stop face 42, and the fixing hole 41 of each of the fixing members 40 functions as a pivot center of the stop face 42. The catch face 34 of each of the movable members 30 is movable to rest on the stop face 42 of the respective fixing member 40 as shown in FIG. 4.

Each of the elastic members 50 is received in the receiving slot 44 of the respective fixing member 40 and biased between the follower block 37 of the respective movable member 30 and a wall of the receiving slot 44 of the respective fixing member 40.

A first one of the locking bolts 60 is in turn extended through the fixing hole 41 of a first one of the fixing members 40, the pivot bore 33 of a first one of the movable members 30, the pivot hole 22 of a first one of the cutting blades 20, the guide slot 23 of a second one of the cutting blades 20, the slide slot 35 of a second one of the movable members 30 and the fixing bore 43 of a second one of the fixing members 40, and a second one of the locking bolts 60 is in turn extended through the fixing bore 43 of the first one of the fixing members 40, the slide slot 35 of the first one of the movable members 30, the guide slot 23 of the first one of the cutting blades 20, the pivot hole 22 of the second one of the cutting blades 20, the pivot bore 33 of second one of the movable members 30 and the fixing hole 41 of the second one of the fixing members 40.

Figure 4:
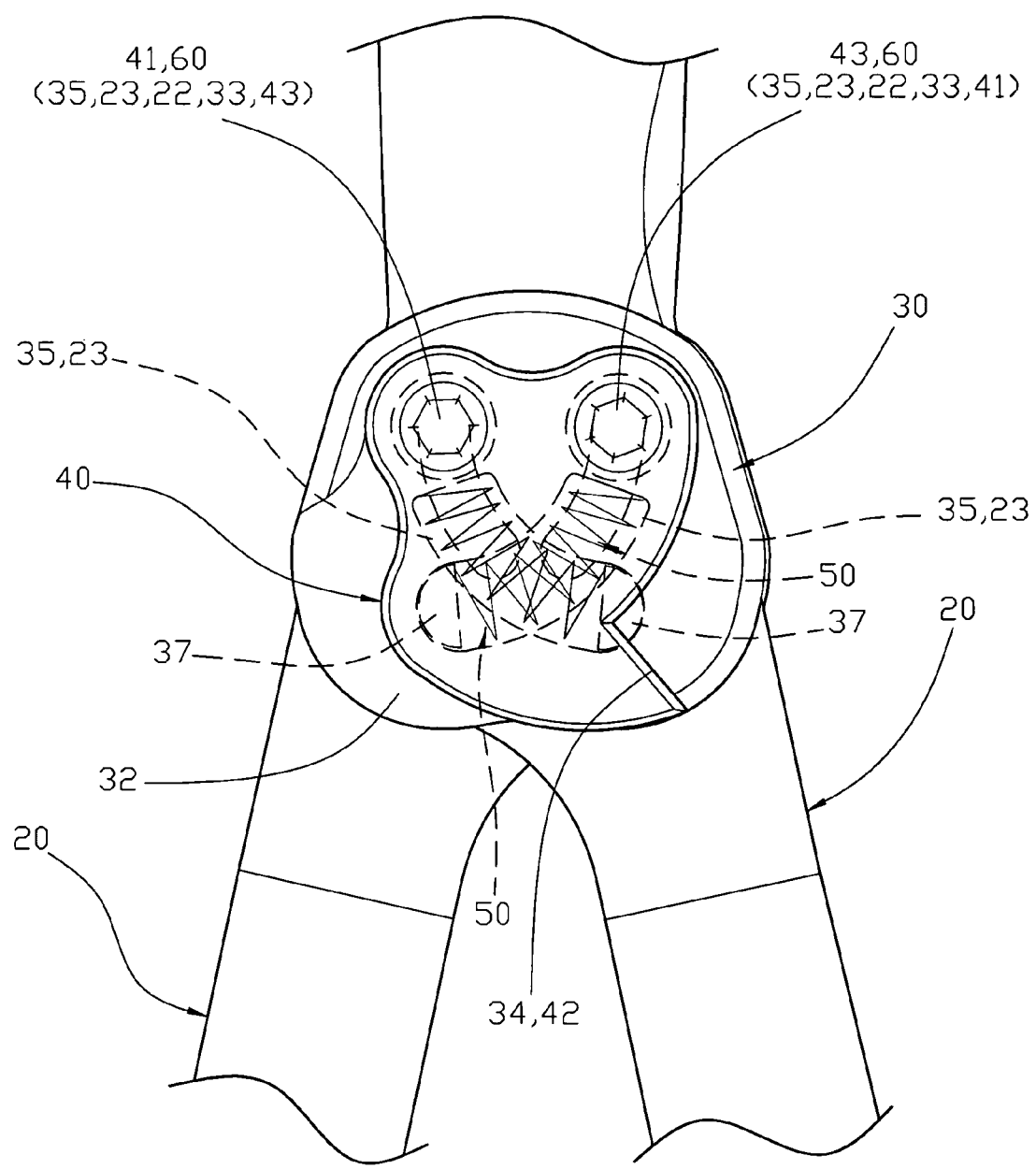
FIG. 4 is a partially front enlarged view of the gardening shears as shown in FIG. 1.

In operation, referring to FIGS. 1-6, when the cutting blades 20 are juxtaposed to each other as shown in FIG. 1, the catch face 34 of each of the movable members 30 is rested on the stop face 42 of the respective fixing member 40 as shown in FIG. 4. At this time, the fixing members 40 are fixed by the locking bolts 60 so that the cutting blades 20 are pivotable about the locking bolts 60 and between the fixing members 40, and each of the movable members 30 is movable with the respective cutting blade 20.

Figure 5:
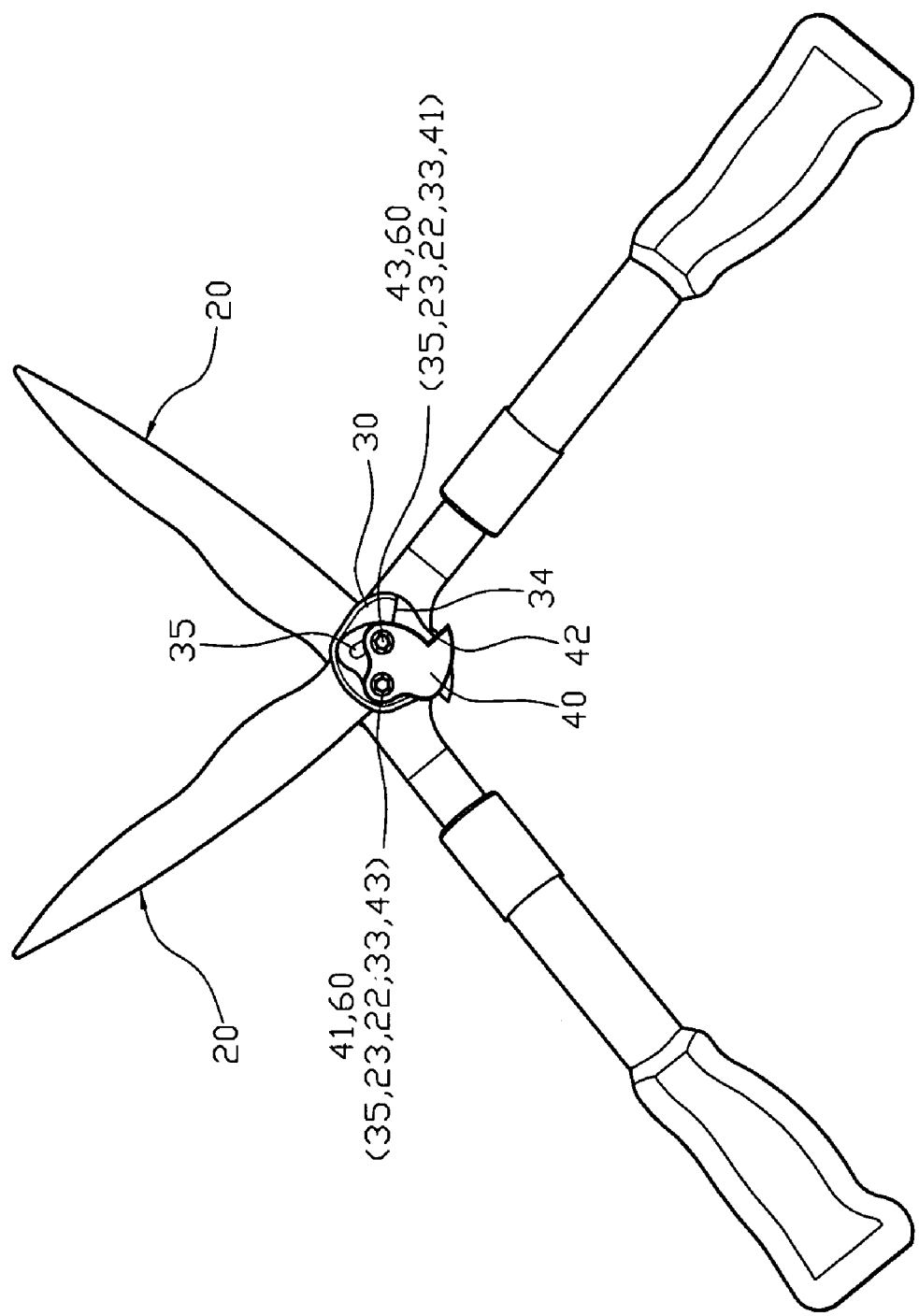
FIG. 5 is a schematic operational view of the gardening shears as shown in FIG. 1.
Figure 6:
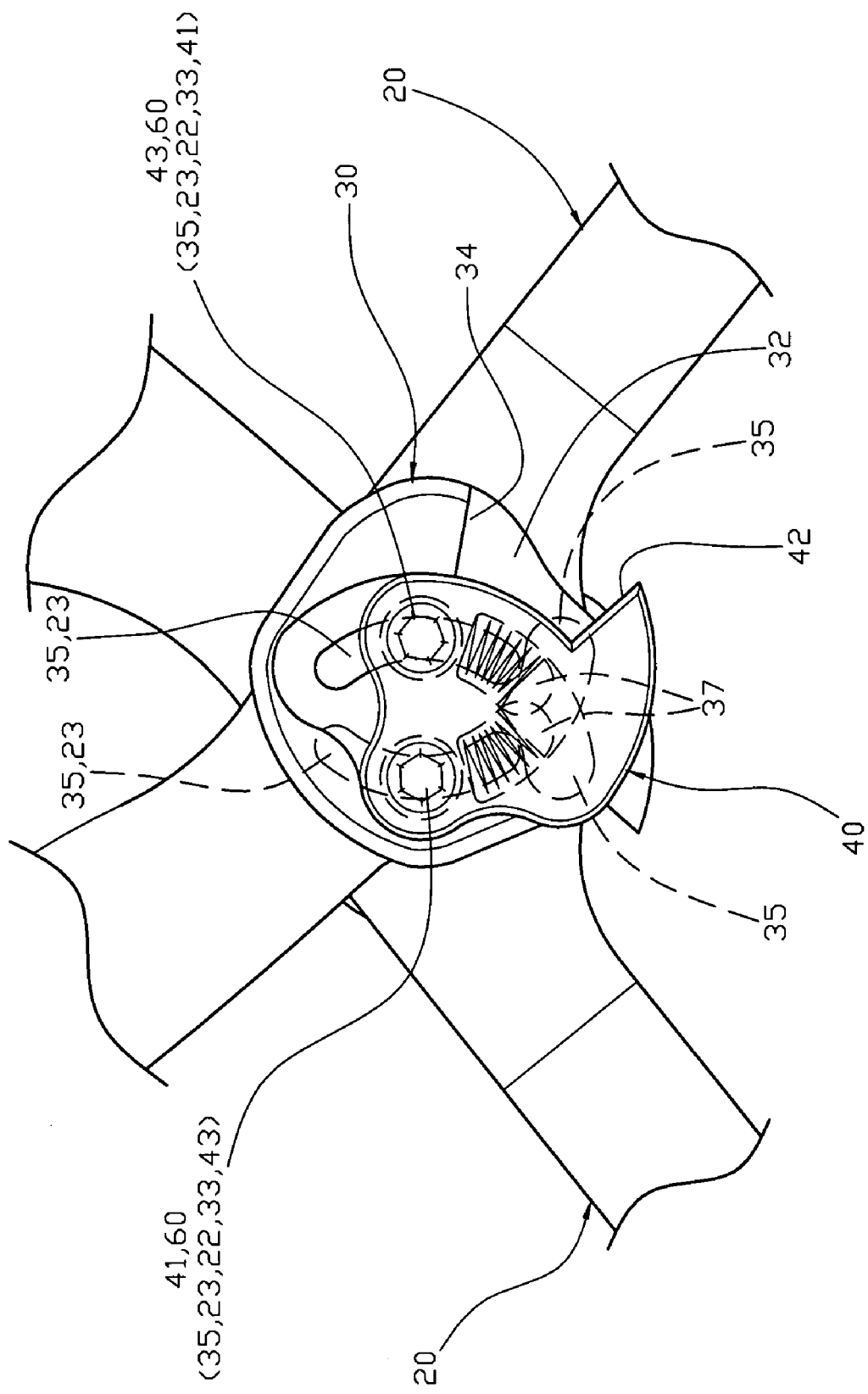
FIG. 6 is a schematic operational view of the gardening shears as shown in FIG. 4.
Figure 7:
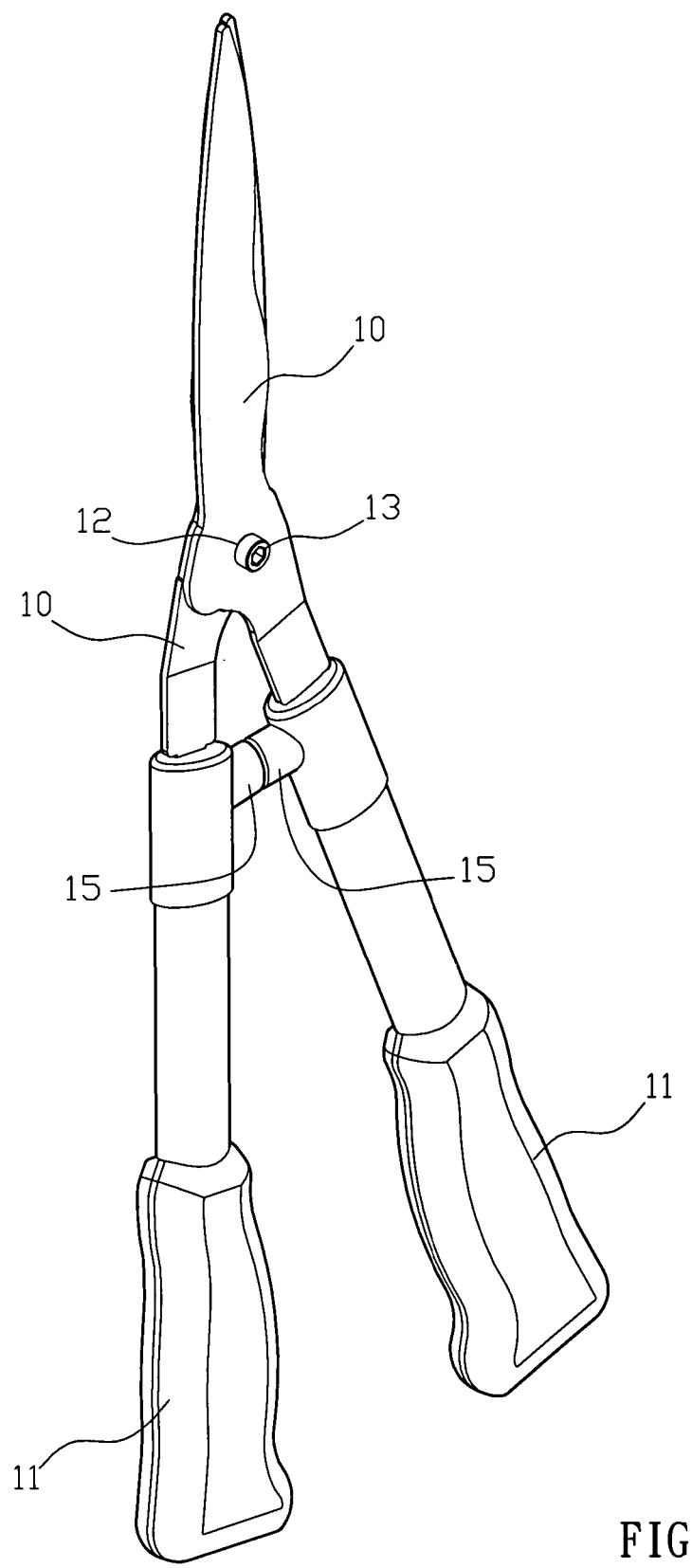
FIG. 7 is a perspective view of a pair of conventional gardening shears in accordance with the prior art.
Figure 8:
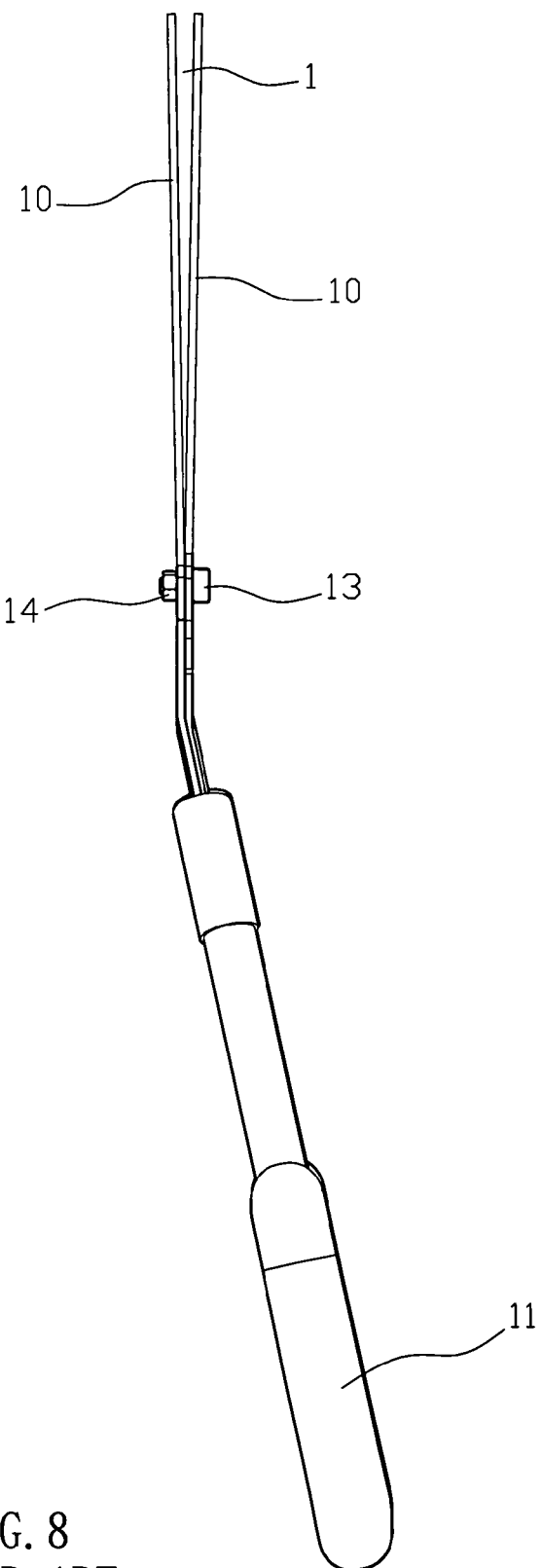
FIG. 8 is a side view of the conventional gardening shears as shown in FIG. 7.

When the cutting blades 20 are pivoted outwardly relative to each other as shown in FIGS. 5 and 6, the first one of the cutting blades 20 is pivotable about the first one of the locking bolts 60 which is extended through the pivot hole 22 of the first one of the cutting blades 20, and the second one of the cutting blades 20 is pivotable about the second one of the locking bolts 60 which is extended through the pivot hole 22 of the second one of the cutting blades 20. At the same time, the guide slot 23 of the first one of the cutting blades 20 and the slide slot 35 of the first one of the movable members 30 are movable on the second one of the locking bolts 60, and the guide slot 23 of the second one of the cutting blades 20 and the slide slot 35 of the second one of the movable members 30 are movable on the first one of the locking bolts 60. In such a manner, the cutting blades 20 are pivoted about the pivot holes 22 respectively and are guided by the guide slots 23 respectively, so that the pivot holes 22 function as two pivot fulcrums of the cutting blades 20 to facilitate pivot movement of the cutting blades 20, thereby preventing the cutting blades 20 from being jammed during the pivot movement.

As shown in FIG. 6, the locking bolts 60 are movable downward in the guide slots 23 of the cutting blades 20 and the slide slots 35 of the movable members 30 when the cutting blades 20 are pivoted outwardly relative to each other to compress the elastic members 50, and the catch face 34 of each of the movable members 30 is spaced from the stop face 42 of the respective fixing member 40.

As shown in FIG. 4, the locking bolts 60 are movable upward in the guide slots 23 of the cutting blades 20 and the slide slots 35 of the movable members 30 when the cutting blades 20 are pivoted toward each other to release the elastic members 50, and the catch face 34 of each of the movable members 30 is movable to rest on the stop face 42 of the respective fixing member 40 by the restoring force of the respective elastic member 50, thereby preventing the cutting blades 20 from being pivoted excessively.

Accordingly, the cutting blades 20 are limited by the fixing members 40 and the locking bolts 60 so that the cutting blades 20 are juxtaposed to each other closely without producing a gap between the cutting blades 20, thereby facilitating a user operating the gardening shears. In addition, the cutting blades 20 are pivoted about the pivot holes 22 respectively so that the pivot holes 22 function as two pivot fulcrums of the cutting blades 20 to facilitate pivot movement of the cutting blades 20, thereby preventing the cutting blades 20 from being jammed during the pivot movement. Further, the cutting blades 20 are guided by the guide slots 23 respectively, so that the cutting blades 20 are pivoted smoothly and stably, thereby facilitating the user operating the gardening shears. Further, the catch face 34 of each of the movable members 30 is movable to rest on the stop face 42 of the respective fixing member 40, thereby preventing the cutting blades 20 from being pivoted excessively.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pair of gardening shears, comprising:
two cutting blades pivotally connected with each other;
two movable members each having a first side mounted on a respective cutting blade;
two fixing members each mounted on a second side of a respective movable member;
two locking bolts each extended through the fixing members, the movable members and the cutting blades;
two locking nuts each screwed onto a respective locking bolt so that the fixing members, the movable members and the cutting blades are locked between the locking bolts and the locking nuts; wherein:

each of the cutting blades has a pivot portion formed with a pivot hole and an elongated guide slot;

each of the movable members is formed with a pivot bore aligning with the pivot hole of the respective cutting blade and an elongated slide slot aligning with the guide slot of the respective cutting blade;

each of the fixing members is formed with a fixing hole aligning with the pivot bore of the respective movable member and a fixing bore aligning with the slide slot of the respective movable member;

a first one of the locking bolts is in turn extended through the fixing hole of a first one of the fixing members, the pivot bore of a first one of the movable members, the pivot hole of a first one of the cutting blades, the guide slot of a second one of the cutting blades, the slide slot of a second one of the movable members and the fixing bore of a second one of the fixing members;

a second one of the locking bolts is in turn extended through the fixing bore of the first one of the fixing members, the slide slot of the first one of the movable members, the guide slot of the first one of the cutting blades, the pivot hole of the second one of the cutting blades, the pivot bore of second one of the movable members and the fixing hole of the second one of the fixing members.

2. The gardening shears in accordance with claim 1, wherein the first side of each of the movable members is formed with a positioning recess secured on the pivot portion of the respective cutting blade and connected to the pivot bore and the slide slot.

3. The gardening shears in accordance with claim 1, wherein the second side of each of the movable members is formed with a receiving recess connected to the pivot bore and the slide slot to receive the respective fixing member.

4. The gardening shears in accordance with claim 3, wherein:

each of the fixing members has a substantially arc-shaped periphery formed with a protruding stop face;

the fixing hole of each of the fixing members functions as a pivot center of the stop face;

the receiving recess of each of the movable members has a periphery formed with a protruding catch face that is movable to rest on the stop face of the respective fixing member;

the pivot bore of each of the movable members functions as a pivot center of the catch face.

5. The gardening shears in accordance with claim 1, further comprising two elastic members each biased between a respective movable member and a respective fixing member.

6. The gardening shears in accordance with claim 5, wherein:

the pivot portion of each of the cutting blades is formed with a locking hole;

the slide slot of each of the movable members has a first side formed with a protruding locking block locked in the locking hole of the respective cutting blade and a second side formed with a protruding follower block;

each of the fixing members is formed with an elongated receiving slot in which the follower block of the respective movable member is movable;

each of the elastic members is received in the receiving slot of the respective fixing member and biased between the follower block of the respective movable member and a wall of the receiving slot of the respective fixing member.

7. The gardening shears in accordance with claim 6, wherein the follower block of each of the movable members has a substantially flattened spherical shape.

8. The gardening shears in accordance with claim 3, wherein each of the fixing members is movable in the receiving recess of the respective movable member when the respective movable member is movable with the respective cutting blade.

9. The gardening shears in accordance with claim 1, wherein the pivot portions of the cutting blades are pivotally connected with each other by the locking bolts and the locking nuts.

10. The gardening shears in accordance with claim 1, wherein the pivot hole and the guide slot of the first one of the cutting blades align with the guide slot and the pivot hole of the second one of the cutting blades respectively.

11. The gardening shears in accordance with claim 1, wherein the guide slot of each of the cutting blades has a substantially arc-shaped profile.

12. The gardening shears in accordance with claim 11, wherein the pivot hole of each of the cutting blades functions as a pivot center of the guide slot.

13. The gardening shears in accordance with claim 1, wherein the slide slot of each of the movable members has a substantially arc-shaped profile.

14. The gardening shears in accordance with claim 13, wherein the pivot bore of each of the movable members functions as a pivot center of the slide slot.

15. The gardening shears in accordance with claim 1, wherein each of the fixing members is located opposite to the respective cutting blade, and the movable members are juxtaposed to each other, so that the cutting blades are encompassed by the movable members.

16. The gardening shears in accordance with claim 1, wherein each of the movable members is secured on the respective cutting blade to move with the respective cutting blade.

17. The gardening shears in accordance with claim 4, wherein:

when the cutting blades are juxtaposed to each other, the catch face of each of the movable members is rested on the stop face of the respective fixing member.

the fixing members are fixed by the locking bolts, and the cutting blades are pivotable about the locking bolts and between the fixing members.

18. The gardening shears in accordance with claim 4, wherein:

when the cutting blades are pivoted outwardly relative to each other, the first one of the cutting blades is pivotable about the first one of the locking bolts which is extended through the pivot hole of the first one of the cutting blades, and the second one of the cutting blades is pivotable about the second one of the locking bolts which is extended through the pivot hole of the second one of the cutting blades;

the guide slot of the first one of the cutting blades and the slide slot of the first one of the movable members are movable on the second one of the locking bolts, and the guide slot of the second one of the cutting blades and the slide slot of the second one of the movable members are movable on the first one of the locking bolts;

the cutting blades are pivoted about the pivot holes respectively and are guided by the guide slots respectively, so that the pivot holes function as two pivot fulcrums of the cutting blades.

19. The gardening shears in accordance with claim 18, wherein:

the locking bolts are movable downward in the guide slots of the cutting blades and the slide slots of the movable members when the cutting blades are pivoted outwardly relative to each other, and the catch face of each of the movable members is spaced from the stop face of the respective fixing member; the locking bolts are movable upward in the guide slots of the cutting blades and the slide slots of the movable members when the cutting blades are pivoted toward each other, and the catch face of each of the movable members is movable to rest on the stop face of the respective fixing member.

\* \* \* \* \*